J. WOLFSON.
CAR LIFTING AND REPLACING DEVICE.
APPLICATION FILED DEC. 1, 1911.
1,026,337.
Patented May 14, 1912.
2 SHEETS—SHEET 2.
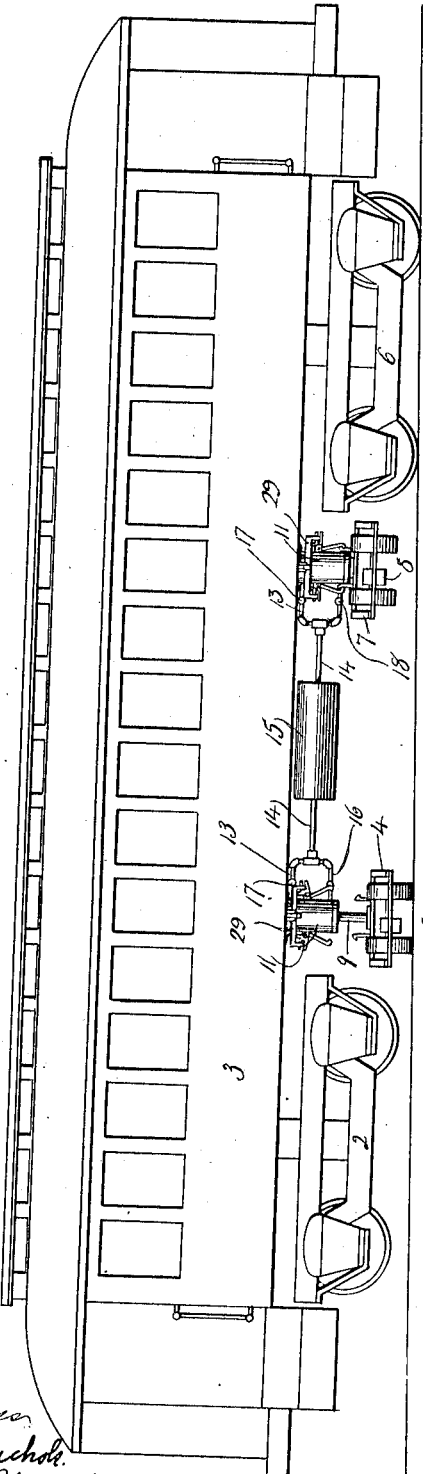
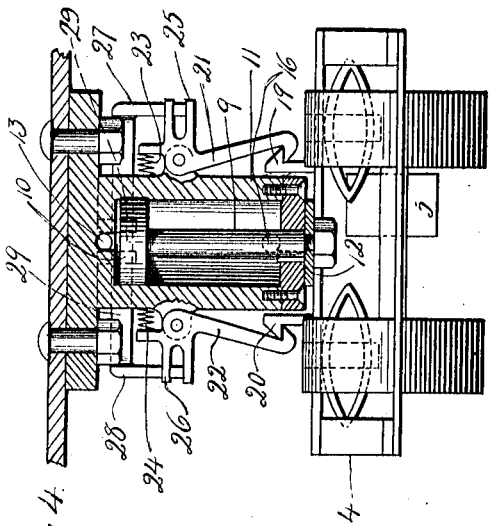
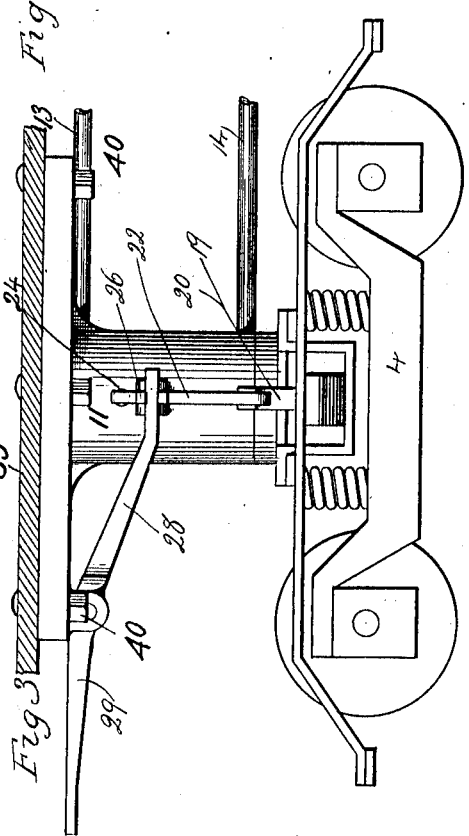

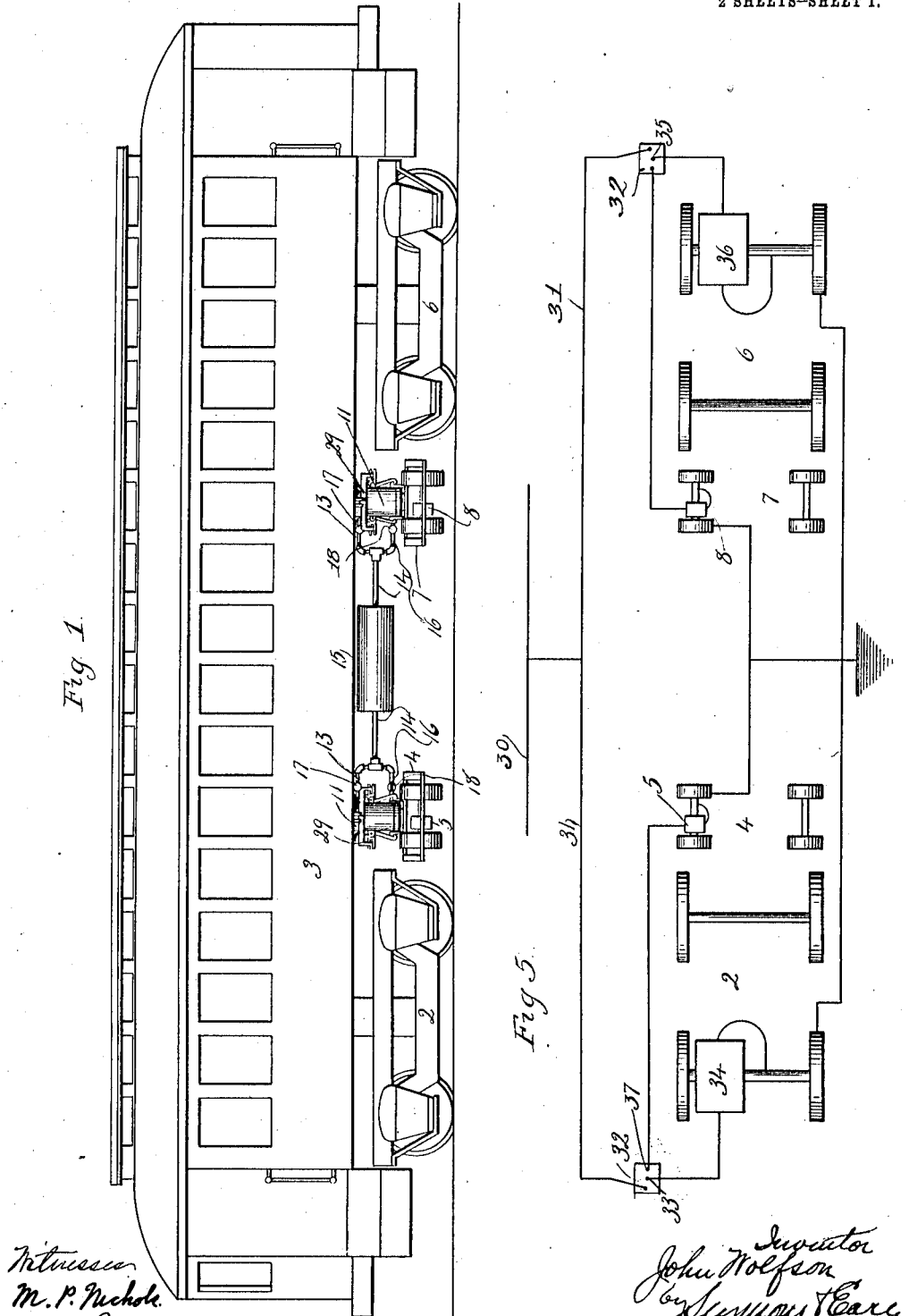

UNITED STATES PATENT OFFICE.

JOHN WOLFSON, OF NEW HAVEN, CONNECTICUT.

CAR LIFTING AND REPLACING DEVICE.

1,026,337.  Specification of Letters Patent.  Patented May 14, 1912.

Application filed December 1, 1911. Serial No. 663,417.

*To all whom it may concern:*

Be it known that I, JOHN WOLFSON, a citizen of the United States, residing at New Haven, in the county of New Haven and State of Connecticut, have invented a new and useful Improvement in Car Lifting and Replacing Devices; and I do hereby declare the following, when taken in connection with the accompanying drawings and the letters of reference marked thereon, to be a full, clear, and exact description of the same, and which said drawings constitute part of this specification, and represent, in—

Figure 1 a side view of a car equipped with auxiliary trucks in accordance with my invention. Fig. 2 is a similar view showing an auxiliary truck at one end of the car brought into operation so as to lift that end of the car. Fig. 3 is a side view of one of the auxiliary trucks, detached. Fig. 4 is a transverse sectional view of the same and Fig. 5 is a diagrammatic view showing the electrical circuits through the main and auxiliary trucks.

This invention relates to an improvement in a car lifting and replacing device, that is, means adapted to lift a car, or at least one end of a car, so that the truck thereof will be raised above the top of the rail, and then to move that end of the car transversely so as to bring the truck over the rail upon which it may be lowered the invention being particularly applicable for electric cars, the object being to provide auxiliary trucks, including auxiliary motors which may be operated from the platform to move the car when it has been raised. The invention consists in the construction and combination of parts hereinafter described and particularly recited in the claims.

Adjacent to one of the trucks 2 of the car 3 is an auxiliary truck 4 including an auxiliary motor 5, and adjacent to the other truck 6 is an auxiliary truck 7, including an auxiliary motor 8. The auxiliary trucks are connected to the lower end of piston rods 9 carrying pistons 10 which enter vertically arranged cylinders 11 having flanges 38 which are secured to the underside of the car floor 39 by bolts 40, these pistons being guided by keys 12 so as to be held against turning. The tops of the cylinders are connected through pipes 13 with a pipe 14 leading to the usual compressed air tank 15, and the lower end of the cylinder is connected through a pipe 16 with the pipe 14, and in the pipe 13 is a three-way valve 17, and in the pipe 16 a three-way valve 18 for purposes as will hereinafter appear.

To hold the auxiliary trucks in their raised or retired position, they are provided on opposite sides with hooks 19 and 20 adapted to be engaged by latches 21 and 22 pivoted to opposite sides of the cylinders 11 and which are normally thrown into their locking positions by springs 23, 24. To lift the latches out of their engagement with the hooks 19 and 20, the latches are formed with outwardly projecting arms 25, 26, which are engaged by the arms 27, 28, of a lever 29, pivotally mounted at the underside of the car where it may be grasped by the hand of an operator from the outside or through the bottom of the car. The auxiliary motors may be set into motion through the usual controller at the ends of the car as indicated in Fig. 5 of the drawings in which is shown a diagram of the circuits. Thus, for instance, the circuit from the trolley wire or third rail 30 is through the usual wires 31 to the controller handle boxes 32. Now if the controller handle is turned to the point 33, the circuit will be through the motor 34 on the truck 2, and thence through the wheels to the track in the usual way; or if the controller handle at the opposite end of the car is turned to the point 35, the circuit will be through the motor 36 on the truck 6 and thence through the wheels to the ground. If, however, the truck 2 should run off the track, and it is desired to operate the auxiliary truck 4, the controller handle will be turned to the point 37 in which case the current will pass through the auxiliary motor 5, and thence to the ground. On the other hand, if the truck 6 runs off the track, the controller handle at that end of the car can be operated to set in motion the auxiliary motor 8 and move the auxiliary truck 7. In case the truck 2 runs off the track, the outer end of the lever 29 will be moved downward to withdraw the latches 21 and 22 out of engagement with the hooks 19 and 20. Then if the upper valve 17 is opened, air will be admitted from the air reservoir 15 to the top of the cylinder 11 above the piston 10 so as to force that piston downward and hence force the auxiliary truck 4 downward until the wheels thereof coming in contact with the ground will lift that end of the car upward until the wheels of the truck 2 are raised above the level of the track. The current will then be switched through the auxiliary motor 5 in one direction or the other so as to move the truck in the desired direction to swing that end of the car into line with the rails.

When in position over the rails, the valve 13 will be turned to allow the escape of air, and the valve 18, which, of course, has heretofore been closed, will be turned to allow air to be forced from the reservoir 15 into the bottom of the reservoir 15 below the piston 10, and so as to lift the auxiliary truck into its raised or retired position, and when raised to the proper extent the spring operated latches 21 and 22 will engage with the hooks 19 and 20 and so hold the truck in its retired or elevated position. If the truck 6 should run off the track, the auxiliary truck 7 will be brought into operation in the manner above described so as to lift that end of the car. Thus either end of the car may be raised to the required extent, and when raised the car can be moved transversely by the auxiliary trucks, which will be under the control of the operator at either end of the car. It will be understood that the extent to which it is necessary to raise one end of the car to replace it on the rails is comparatively slight, the drawings exaggerating the extent of movement.

While this device is especially designed for replacing cars on the rails, it is also very useful in case of accident, when a car has run over a person and that person is pinned beneath the trucks. In such a case the lifting device may be operated so as to raise the truck sufficiently to release the person.

I claim:—

1. In a car, the combination with the main trucks thereof, of an auxiliary truck arranged adjacent to each of the main trucks, a motor mounted in each auxiliary truck, means for operating said motors and means for raising and lowering the said auxiliary trucks.

2. The combination with a car and the main trucks thereof, of a compressed air tank, auxiliary trucks arranged adjacent to the main trucks, a motor for each auxiliary truck, means for operating said motors, a piston and cylinder connection for each auxiliary truck with the car, and connections between said cylinders and compressed air tank, whereby the auxiliary trucks may be raised or lowered, and means for operating said motors.

3. The combination with a car and main trucks thereof, of auxiliary trucks arranged adjacent to the main trucks, cylinders above the auxiliary trucks, pistons connected with the auxiliary trucks and extending into said cylinders, means for operating the piston, and latches arranged on opposite sides of the cylinder and adapted to engage with the auxiliary trucks whereby the auxiliary trucks are held in their elevated position.

4. The combination with a car and main trucks thereof, of auxiliary trucks arranged adjacent to the main trucks, cylinders above the auxiliary trucks, pistons connected with the auxiliary trucks and extending into said cylinders, means for operating the piston, and latches arranged on opposite sides of the cylinder and adapted to engage with the auxiliary trucks, whereby they are held in their elevated position, and a lever adapted to release said latches.

In testimony whereof, I have signed this specification in the presence of two subscribing witnesses.

JOHN WOLFSON.

Witnesses:
   FREDERIC C. EARLE,
   CLARA L. WEED.

---

Copies of this patent may be obtained for five cents each, by addressing the "Commissioner of Patents. Washington, D. C."